United States Patent [19]

Gastman et al.

[11] Patent Number: 5,711,887
[45] Date of Patent: Jan. 27, 1998

[54] WATER PURIFICATION SYSTEM

[75] Inventors: David L. Gastman, Snohomish; Donald B. Ribelin, Everett, both of Wash.

[73] Assignee: Global Water Industries, Inc., Aurora, Colo.

[21] Appl. No.: 509,519

[22] Filed: Jul. 31, 1995

[51] Int. Cl.[6] ................................ C02F 1/78; C02F 1/32
[52] U.S. Cl. ..................... 210/748; 210/694; 210/750; 210/760; 210/764; 422/24
[58] Field of Search ........................... 210/694, 748, 210/750, 758, 760, 764; 422/24

[56] References Cited

U.S. PATENT DOCUMENTS

| | | |
|---|---|---|
| 3,276,994 | 10/1966 | Andrews . |
| 4,563,286 | 1/1986 | Johnson et al. ............... 210/721 |
| 4,632,766 | 12/1986 | Firnhaber et al. ............. 210/760 |
| 4,898,679 | 2/1990 | Siegel et al. .................. 210/760 |
| 4,913,827 | 4/1990 | Nebel ........................... 210/748 |
| 5,053,140 | 10/1991 | Hurst ........................... 210/760 |
| 5,114,549 | 5/1992 | Shimamune et al. ......... 210/760 |
| 5,178,755 | 1/1993 | LaCrosse . |
| 5,234,606 | 8/1993 | Kazama et al. . |
| 5,268,104 | 12/1993 | Masoomain . |
| 5,273,664 | 12/1993 | Schulz . |
| 5,302,298 | 4/1994 | Leitzke . |
| 5,397,480 | 3/1995 | Dickerson . |
| 5,433,866 | 7/1995 | Hoppe et al. . |
| 5,494,576 | 2/1996 | Hoppe et al. ................. 210/748 |
| 5,505,856 | 4/1996 | Campen et al. .............. 210/694 |
| 5,512,178 | 4/1996 | Dempo ......................... 210/748 |

FOREIGN PATENT DOCUMENTS 0141468  12/1976  Japan .

*Primary Examiner*—Neil McCarthy
*Assistant Examiner*—Theodore M. Green
*Attorney, Agent, or Firm*—Sheridan Ross P.C.

[57] ABSTRACT

A system for the purification of contaminated water to produce potable water. The apparatus of the system may be mounted on a mobile platform for use in remote locations or may be sized and adapted for permanent installation. The process ozonates the contaminated water, while the water is maintained under substantially laminar flow conditions, in a series of vessels under countercurrent process flow conditions. The water is treated with sufficient ozone, and the apparatus provides a sufficient residence time, to oxidize pathogens and oxidizable matter. Residual ozone is substantially completely neutralized with ultraviolet radiation. Ozone off gas not dissolved in the water during ozonation is collected and any ozone in the gas is converted to oxygen to prevent ozone release into the atmosphere.

18 Claims, 9 Drawing Sheets

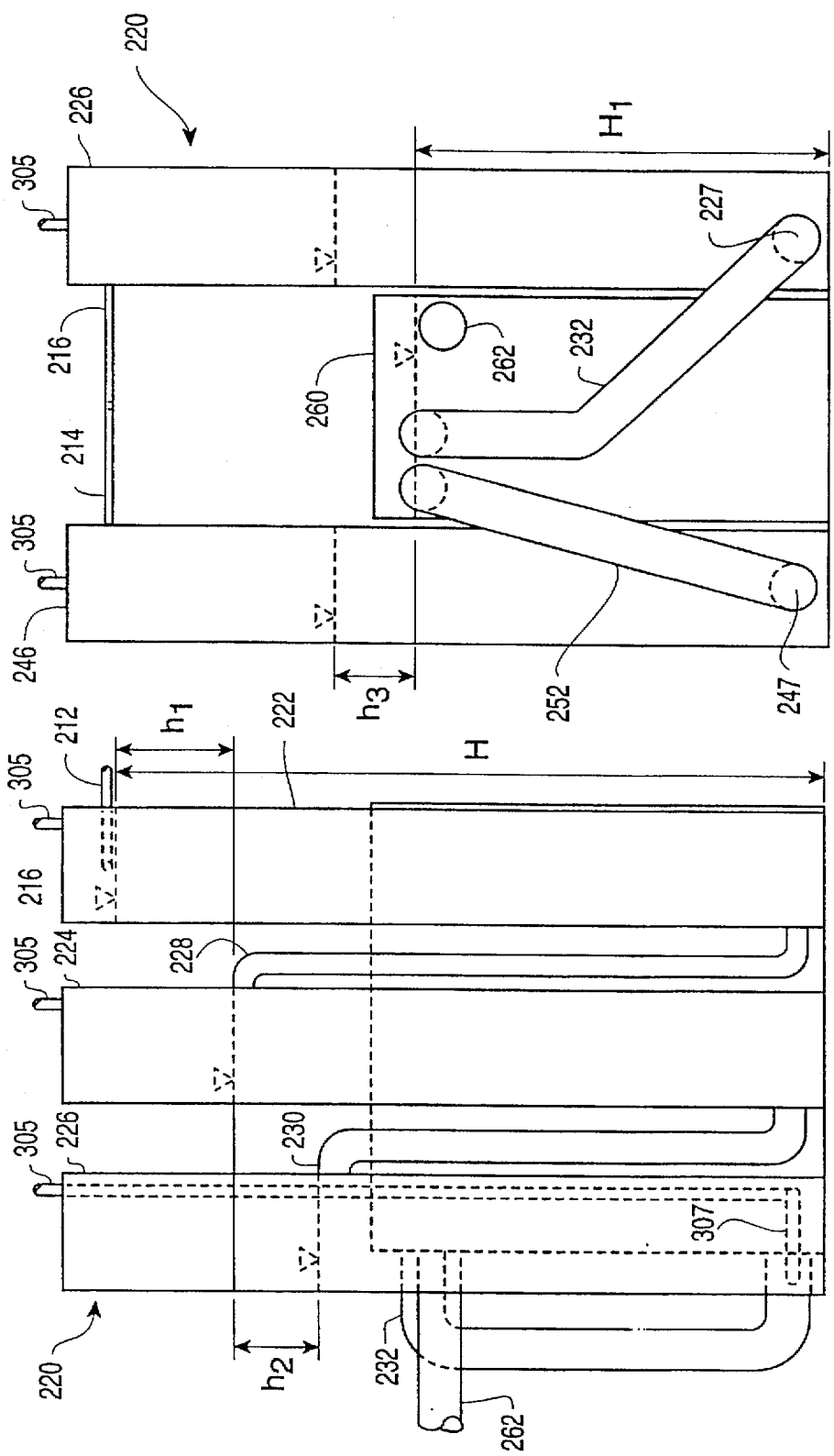

WATER PURIFICATION SYSTEM

FIELD OF THE INVENTION

The invention relates to the purification of water to produce potable water suitable for human consumption. More particularly, the invention provides a process and apparatus for the treatment of contaminated waters of all kinds with ozone to produce potable water without release of ozone into the atmosphere.

BACKGROUND OF THE INVENTION

It has become customary to treat water for human consumption with chlorine, or a chlorine-based chemical. This technique, "chlorination," is designed to destroy pathogens, oxidize organic matter, and render harmless any toxic components that may be present in the water. Typically, due to the mechanism by which chlorine operates, an excessive amount of chlorine must be used so that a chlorine residue is always present in the water. This chlorine residue is readily detectable, for instance, when water flows from a faucet, by a chlorine odor. Chlorine operates by disrupting the outer membrane of cellular organisms, causing organic cellular internal material to spill into the water. While this mechanism is effective in disabling pathogens, it in effect distributes cellular organic material in the water so that this material is available as a nutrient for other microorganisms that might subsequently infect the water. Consequently, to prevent reinfection, a residual level of chlorine sufficient to prevent reinfection and maintain sterility must be maintained in the water. Such chlorine levels not only pose odor and taste issues, but also increase corrosion of water supply pipelines.

Aside from the unpleasant odor and taste, and increased corrosion levels due to the residual level of chlorine that must be maintained in water subject to sterilization by chlorination, chlorine compounds are also frequently present in the water. Although these compounds are usually present in low concentrations, some of these compounds are potentially toxic and may pose health hazards. Typically, these compounds are the reaction product of chlorine or a chlorine-containing treatment chemical and a substrate that is present in the water undergoing treatment. These substrates may be organic or inorganic.

As an alternative to chlorination, it has long been known to ozonate water in order to oxidize pathogens and any other oxidizable organic or inorganic material that might be present in contaminated water. Ozone is a semistable gas formed of three oxygen atoms, instead of the two atoms that form oxygen gas. Ozone is most typically produced by an electrical arc discharged through air causing oxygen atoms to combine with an oxygen free radical that is formed. Ozone rapidly undergoes reaction to revert to more stable oxygen, releasing an oxygen free radical in the process. Two such free radicals can combine to form an oxygen molecule or the free radicals can oxidize an oxidizable substrate.

Usually, ozone gas is supplied to water by pumping the water through a venturi and allowing the venturi to draw ozone into the water as it passes through the throat of the venturi under the natural suction created by the venturi. However, the violent turbulence found in the throat of the venturi causes a large proportion of the ozone to revert to oxygen so that an excess of ozone must be added to ensure that sufficient ozone is available in the water to oxidize pathogens and other oxidizable contaminants. Moreover, not only is ozone relatively expensive to produce, as compared to chlorine or chlorine-containing chemical additives, but its use poses an environmental challenge. The United States Environmental Protection Agency (EPA) has determined that ozone is an atmospheric pollutant. As a result, the EPA has promulgated regulations controlling the amount of ozone that may be present in the atmosphere, and that strictly prohibit the release of ozone into the atmosphere.

In remote areas, and in Third Word counties, the purification of contaminated water provides further challenges. Available water supplies are often contaminated. Moreover, the water supply is sometimes limited and can be exhausted seasonally, requiring users to move to another supply. Under these conditions, a system for water purification must be robust, simple to use, automated with robust controls, mobile, and relatively inexpensive. While treated water may be transported to these locations, such transportation is expensive for a heavy bulk item that is used in large quantities. Also, transportation and storage pose potential reinfection issues.

SUMMARY OF THE INVENTION

The invention provides a system for the purification of contaminated water with ozone to provide potable water. The system of the invention may be mounted to a trailer and may be transported to remote locations for use. Alternatively, the system may be sized for permanent installation at a particular location.

The system of the invention is designed to maintain water undergoing purification under conditions of minimal agitation or turbulence to thereby increase the mass transfer of ozone into the water. Thus, the water undergoing purification is preferably induced to flow under gravity from one treatment vessel to another while being ozonated. Further, ozone-containing off gases are collected in vent headers and are treated, by exposure to ultraviolet light in a wavelength that catalyzes the conversion of ozone to oxygen. Thus, only oxygen is released into the atmosphere. Consequently, the system of the invention does not contribute to environmental ozone pollution.

In a process of the invention, contaminated water is obtained from a source, such as a river, lake, or well, and is preferably first passed through an organic whirlpool separator to remove particulates larger than about 75 microns in size. The separated water is then charged, in equal quantities, to parallel trains of columnar vessels in series, or a single train of such vessels, depending upon the volumetric rate of water treatment and the sizes of the vessels. Influent contaminated separated water flows into the first vessel of a train and rises to a first liquid level in the vessel. The vessel is supplied with an internal diffuser, located near the base of the vessel, for bubbling ozone gas into the water in the vessel, thereby allowing ozone to diffuse into the water. Since the process of oxidizing pathogens, organic matter, and oxidizable materials in the water is continuous, the ozone supply is continuously being depleted from the water while additional ozone diffuses into the water. Moreover, since water flows downward at a very slow rate in the column, and is not subject to turbulence, a high rate of mass transfer from upward migrating ozone bubbles to water is achieved. Since the water flows downward while the ozone gas bubbles migrate upward, the system also has counter-current characteristics to further enhance mass transfer. Parameters of this vessel, and other vessels in the train, are selected so that the height of the water in the vessels, the residence time of the water in the vessels, and the rate of ozone addition provide an ozone concentration in the water in the range from about 1.0 to about 8.0 milligrams per liter, preferably in the range from about 1.5 to about 4.0 mg/l.

Water flows continuously from the first columnar vessel, through an outlet near its base, via a connecting conduit into an inlet to a second columnar vessel of the train of vessels. The inlet of the second vessel is located at an elevation lower than the inlet to the first vessel so that the differential between the height of the liquid in the first vessel and the inlet of the second vessel provides a static head for driving water from the first vessel into the second vessel. The rate of water flow through the system is controlled by the magnitude of such static heads, which maintain gravity flow of water through the system of the invention. This method of water transfer from one vessel to another avoids agitation and turbulence created in pumps and allows greater ozone mass transfer into the water. The second vessel, like the first vessel, is supplied with a diffuser for bubbling and diffusing ozone into the water undergoing treatment.

Water from the second columnar vessel flows continuously under gravity into a third columnar vessel of the train. Water being treated flows from an outlet near the base of the second columnar vessel through a conduit to an inlet of the third columnar vessel. The inlet of the third columnar vessel is located at an elevation lower than the height of water in the second columnar vessel. As before, this difference in elevation provides a static head of liquid sufficient to cause water to flow from the second vessel into the third vessel. The third vessel is supplied with a diffuser, as in the case of the first two vessels, for ozonating the water being treated.

The parallel trains of columnar vessels provide intimate contact between ozone and water under conditions of minimal turbulence or agitation so that mass transfer of ozone to liquid is enhanced.

Ozonated water exiting from the third columnar vessel, through an opening near its base, flows continuously under gravity into a retention tank that is partitioned into separate adjoining tank compartments that are in fluid communication. Thus, the ozonated water first flows into the inlet of a first tank compartment through an inlet near its upper end. The inlet is located at an elevation below the elevation of the inlet to the third columnar vessel so that a static head of water provides the driving force for continuous water flow from the third columnar vessel into the first tank compartment. The first tank compartment, like the columnar vessels, is supplied with a diffuser for introducing additional ozone into the water. Water flows from a rear opening at the base of the tank wall into the second tank compartment. Water fills the second tank compartment to a height approximating the height in the first tank compartment. The second tank compartment provides a residence time for the water undergoing treatment that allows ozone to perform its oxidative function. The water then flows from an outlet near the top of the second tank compartment into a third adjoining tank compartment. Since flow is under gravity, driven by a liquid static head, the outlet is at a lower level than the inlet to the first tank compartment. The third tank compartment is supplied with an ozone diffuser to replenish ozone used up during the water purification process and to provide a residual amount of ozone in the treated water, typically about 1.5 mg/l. Water containing residual ozone flows continuously, as before under static head motive force, from the third tank compartment through an outlet near its base into an adjoining fourth tank compartment.

An ultraviolet irradiation chamber is in fluid communication with the fourth tank compartment. Water flows continuously under gravity (assisted by pump suction provided by a pump drawing water from the chamber) from the fourth tank compartment into the ultraviolet irradiation chamber. In the irradiation chamber, the water is subjected to radiation in ultraviolet wavelengths that are selected to catalyze the activity of ozone to rapidly oxidize any residual pathogens and organic materials, and wavelengths that catalyze the reduction of ozone to oxygen. Contact time in the chamber is not critical since reactions are very rapid. However, contact times may range from about 10 seconds to as much as 2 minutes. Water withdrawn from the ultraviolet chamber contains a harmless amount of any residual ozone and is substantially free of pathogens, containing less than 1 coliform microorganism per 100 ml of water, and oxidizable contaminants. The harmless residual amount, about 0.04 mg/l, maintains water sterility in storage.

Water withdrawn from the ultraviolet chamber is pumped through a filter medium to remove any particulates greater than about 10 microns in size. Thereafter, the filtered water is subjected to an activated carbon polishing process to remove residual odor, taste, and color to produce potable water meeting EPA standards.

In accordance with the invention, any ozone off gas escaping from upper surfaces of liquids in those vessels where water undergoes ozonation is collected by a ducting system and carried to a central collection duct. In this duct, the ozone off gas is treated with ultraviolet radiation to neutralize the ozone to produce oxygen. The resultant gas, free of ozone, is then released into the atmosphere.

The system of the invention has robust automatic controls. Thus, the system is simple to operate. When the contaminated water charge pump has been turned on, the control system automatically activates and controls the system to achieve and maintain steady state. Moreover, the automatic controls also provide for intermittent backwashing of the filters, depending upon differential pressure buildup across the filters, so that the system is able to operate continuously.

Systems according to the invention may be constructed in various size ranges to accommodate a range of contaminated water treatment rates. In certain embodiments, the system may be sized to mount on a mobile platform for ease of transport to remote locations. Moreover, it will be readily apparent that water may be treated repeatedly through the system if the water is so contaminated that a single pass through the system does not produce water of a desired quality. Under these circumstances, the water passes through the columnar vessels in series, the retention tank, and the irradiation chamber, and is then recycled back through the columnar vessels, retention tank, and irradiation chamber. After passing through the system twice, the water is then charged to the ultraviolet irradiation chamber for ozone neutralization. Consequently, the system of the invention is flexible in terms of water treatment rates, simple to operate, and produces potable water from water previously contaminated with pathogens and organic matter exhibiting a biological oxygen demand.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, none dram to scale, and for illustrative purposes only, wherein:

FIG. 3A is a schematic side view of embodiments of columnar ozonating vessels;

FIG. 3B is an end view of the columnar vessels of FIG. 3A, showing a partitioned tank interposed between trains of columnar vessels;

DETAILED DESCRIPTION OF THE PREFERRED EMBODIMENTS

Figure 1:
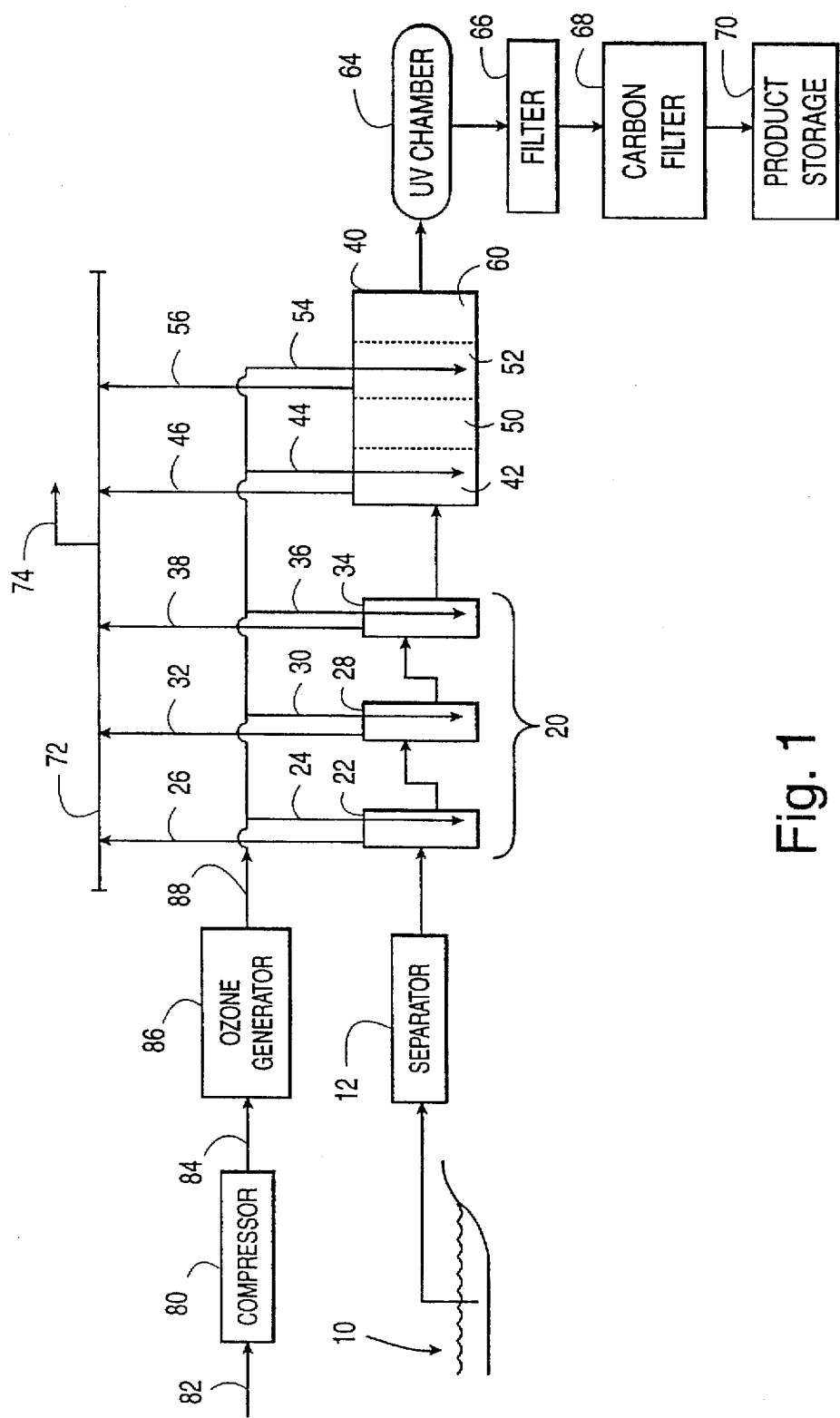
FIG. 1 is a schematic process flow diagram showing an embodiment of the invention.

Briefly, the invention provides a system for the continuous purification of contaminated water to produce potable water, suitable for human consumption. In principle, the invention ozonates contaminated water in a unique process and apparatus that permit a high degree of saturation of the water with ozone to promote oxidation of pathogens, organic matter, and other oxidizable matter present in the contaminated water. In an important aspect of the invention, the contaminated water, while undergoing treatment, flows through the apparatus of the invention under controlled conditions that minimize turbulence. These controlled conditions include liquid static head driving forces of predetermined magnitude that maintain the water under substantially laminar flow conditions in treatment vessels, while inducing minimal turbulence in the water at those junctures where the water is subjected to changes in pressure, such as conduit and vessel entrances and exits. These juncture-induced turbulence effects are minimized by providing large vessel inlets and outlets to minimize pressure drops and by suitably sizing all conduits and vessels. Also, liquid levels are allowed to rise up to inlets of the vessels, whenever possible, to minimize splashing of influent water onto water in vessels. More particularly, the invention includes maintaining flowing water in treatment vessels at a controlled depth while maintaining laminar flow conditions in the vessels. Simultaneously, ozone is supplied to the water near a base of certain of the treatment vessels so that ozone bubbles disperse upward substantially throughout the height of the water. Under these conditions, ozone mass transfer into the water is maximized. The ozonation process is preferably carried out under ambient temperatures and pressures. When water temperatures approach 115° F. (43° C.), the solubility of ozone declines rapidly. At this point water may have to be cooled prior to treatment in the inventive system. Such cooling may be carried out by means of a water cooling tower (evaporative cooling) or heat exchange with a refrigerant, or other available means.

According to the system of the invention, after ozonation a residual amount of ozone remaining in the water is neutralized. Preferably, this neutralization is effected by subjecting the water to ultraviolet radiation of wavelengths that catalyze the residual ozone to oxidize any remaining pathogens, organic matter, or other oxidizable material, and also ultraviolet radiation of wavelengths that catalyze the ionization of ozone to produce oxygen.

After neutralization of residual ozone, the now pathogen- and ozone-free water is preferably filtered. In a first stage of the filtration process, the water is filtered through a preferably uniform medium, such as uniformly sized silica sand particles, to remove any particulates greater than about ten microns in size. Thereafter, in most preferred embodiments, the filtered water is subjected to further filtration through an activated carbon medium to remove any residual odor, taste, and color. The effluent from the activated carbon filter is pathogen-free, odor-free, color-free, and eminently suitable for human consumption.

In the specification and claims, the terms "gravity flow" or "flows under gravity" or "flows under pressure provided by a static head of liquid," when referring to the flowing of water through the apparatus of the invention, mean that the water flows without the assistance of a pump, and relies on gravity and the relative arrangement of liquid heights in sequential vessels of the apparatus to provide a static head motive force. Further, flow conditions are preferably such as to maintain substantially laminar flow regions within liquid-filled vessels of the apparatus of the invention, especially those vessels in which ozonation takes place. The magnitude of static liquid heights and conduit and vessel sizes are preferably predetermined to achieve laminar flow characteristics in the vessels of the system to facilitate mass transfer of ozone from the bubble phase to the continuous water phase.

It should be understood that, while ozone is used to purify contaminated water, according to the invention, the ozone may be present as either a pure gas or together with other gases, such as air, as a carrier gas. Preferably, the ozone gas according to the invention is generated in situ by electrical discharge through air. Consequently, the ozone gas will be present in an airstream that is supplied to the apparatus for ozonating water undergoing treatment. Thus, reference to "ozone off gas" under these circumstances refers to a gas that escapes from an upper surface of liquid in a vessel, which contains at least some ozone, generated by the ozone generator of the system. Of course, if pure ozone is used in the system of the invention, then the ozone off gas will not include air.

In order to better appreciate the invention, reference may be had to the accompanying schematic, illustrative FIGURES showing major equipment of a preferred embodiment of the invention. Reference will also be made, wherever appropriate, to sizes of equipment where these affect fluid flow phenomena. Thus, although the system may be constructed for a wide range of water flow rates, reference may be made herein to a ten U.S. gallon per minute system, and its dimensions, from which a person of skill in the art can readily construct systems of greater or smaller capacity.

FIG. 1 schematically illustrates a preferred embodiment of the continuous process of the invention. Contaminated water 10 is withdrawn from a stream, lake, or other source and is preferably first pumped to an organic whirlpool separator 12 (for example, that sold under the name ODIS by EFCO, Inc. of N. Hollywood, Calif.) for removal of silt, debris, and any other large particles greater than about 70 microns. The separated contaminated water is then charged to a train 20 of columnar ozonation vessels in series. As will be explained in more detail later, the fluid flow affecting parameters of these vessels are arranged so that water flows continuously from the first vessel 22 to the last vessel 34 under gravity. The first columnar vessel 22 is supplied with a diffuser device 24 for distributing fine bubbles of ozone throughout the height of the water flowing through the vessel. Water residence time in this vessel is preferably of the order of about 7 minutes. Ozone gas that does not diffuse into the water leaves the vessel 22 through a duct 26 and enters into an ozone collection header 72. As explained above, ozone is preferably carried in an airstream due to its preferred generation in air, as described more fully below. Thus, air and residual ozone not diffused into the water must be vented. This "ozone off gas" containing ozone and residual air component gases, is collected in header 72. Ozonated water flows continuously from the first vessel 22 into the second vessel 28, which is also supplied with a diffuser 30 and a duct 32 for removing ozone off gas into the ozone collection header 72. This vessel has a water residence time of the order of about 6 minutes. Ozonated water exiting from vessel 28 enters the third, and last, columnar vessel 34 of the train 20. The third columnar vessel is also equipped with a diffuser 36 for distributing ozone throughout the liquid and a duct 38 for conveying ozone off gas to the ozone collection header 72. Residence time is on the order of about 5 minutes.

The water, now containing from about 0.5 to about 8.0 mg/l of ozone, preferably about 1.5 to about 4 mg/l of ozone, flows continuously under gravity from vessel 34 into a partitioned retention tank 40. This tank contains several adjacent compartment tanks, each in both liquid and gaseous communication with each other. In a first compartment 42 of the partitioned tank 40, having a residence time of about 2 to about 4 minutes, more ozone is supplied to the water through a diffuser 44. Ozone off gas flows from the tank 42 through an overhead duct 46 to the ozone collection header 72. Ozonated water flows continuously under gravity from compartment 42 into second tank compartment 50. Tank compartment 50 is a residence compartment designed to hold the water for a predetermined period of time, from about 1.5 to about 3.0 minutes, to allow oxidation of pathogens, organic matter, and other oxidizable material. From this residence compartment, the water flows continuously under gravitational force to a third tank compartment 52 that is supplied with an ozone diffuser 54. In this tank, having a residence time of about 2 to about 3 minutes, further ozone is added to scavenge any residual oxidizable matter in the water. Ozone off gas is transported through duct 56 to collection header 72. Finally, the ozonated water gravity flows continuously from tank 52 into a holding tank section 60, having a residence time of about 2 to about 30 minutes, of the partitioned tank 40.

Water is continuously withdrawn, under pump suction-assisted gravity flow conditions, from holding tank 60 and transferred to ultraviolet irradiation chamber 64. In this chamber, the water is subjected to ultraviolet radiation to both catalyze the oxidation reactions of ozone and thereby oxidize any residual oxidizable matter, and radiation in a wavelength that neutralizes the ozone. To ensure sufficient radiation is provided, a 10-gallon per minute treatment system is fitted with at least one 40-watt source of each wavelength of ultraviolet radiation. Since the neutralization of ozone with ultraviolet radiation is very rapid, water residence time in this tank is not critical and the tank may be sized for an about 2 minute residence time. Water exiting from the ultraviolet irradiation chamber is substantially free of ozone. Ozone is bled into the product tank at a rate sufficient to maintain water sterility, preferably to produce a concentration of ozone in water of about 0.04 mg/l of ozone.

Water is continuously withdrawn from the ultraviolet irradiation chamber 64 and pumped through a first filter 66 to remove particulates, and thereafter a second filter, in series, filled with an activated carbon filter medium. Filter 66 contains a filter medium for removing any particulates greater than about 10 microns in size, while the activated carbon filter medium of filter 68 removes residual odor, taste, and color from the water. Water exiting from the carbon filter is piped to a product storage tank 70 to supply potable water.

The flow rate of water through the system is such as to provide a total liquid residence time of the water in the columnar vessels and partitioned retention tank sufficient to allow oxidation of substantially all pathogens, microorganisms, and oxidizable organic matter. The residence time needed is clearly also dependent upon the degree of contamination of the water to be treated. Nevertheless, it is preferred that the residence time be of the order of about 10 to about 60 minutes, most preferably about 15 to about 30 minutes. This should ensure an apparatus sized to treat most contaminated waters to produce potable water in a single pass of the water through the system. Of course, water purification does not depend solely on residence time but also on the concentration of ozone in the water, since this available ozone performs the purification function. Typically, ozone concentration should be maintained in the range about 1.0 to about 8.0 mg/l, preferably about 1.0 to about 4.0 mg/l, most preferably about 1.5 to 1.8 mg/l, in the ozonating columnar vessels and the ozonating compartments of the partitioned retention tank.

As explained above, ozone off gas is collected from all sources in a header 72. This header is supplied with a source of ultraviolet radiation in a wavelength that catalyzes the breakdown of ozone into oxygen. As a result, the gas exiting in conduit 72 from the collection header 72 is environmentally harmless.

Ozone for use in the system of the invention is prepared in situ in an ozone generator. As shown in FIG. 1, air 82 from the atmosphere is induced into the suction of a compressor 80. In the compressor unit the air is first filtered to remove oil and particulates, then dried and compressed to a pressure sufficient to force the air through the diffusers during ozonation of water being treated. The air is conveyed, under pressure, in conduit 84 to an ozone generator 86. In this generator the air is subjected to an electrical arc discharge to convert a proportion of the oxygen to ozone. Air containing ozone then flows under pressure into ozone distribution header 88 from which ozonated air is charged under pressure-controlled conditions into each of the diffusers 24, 30, 36, 44, and 54.

Figure 2:
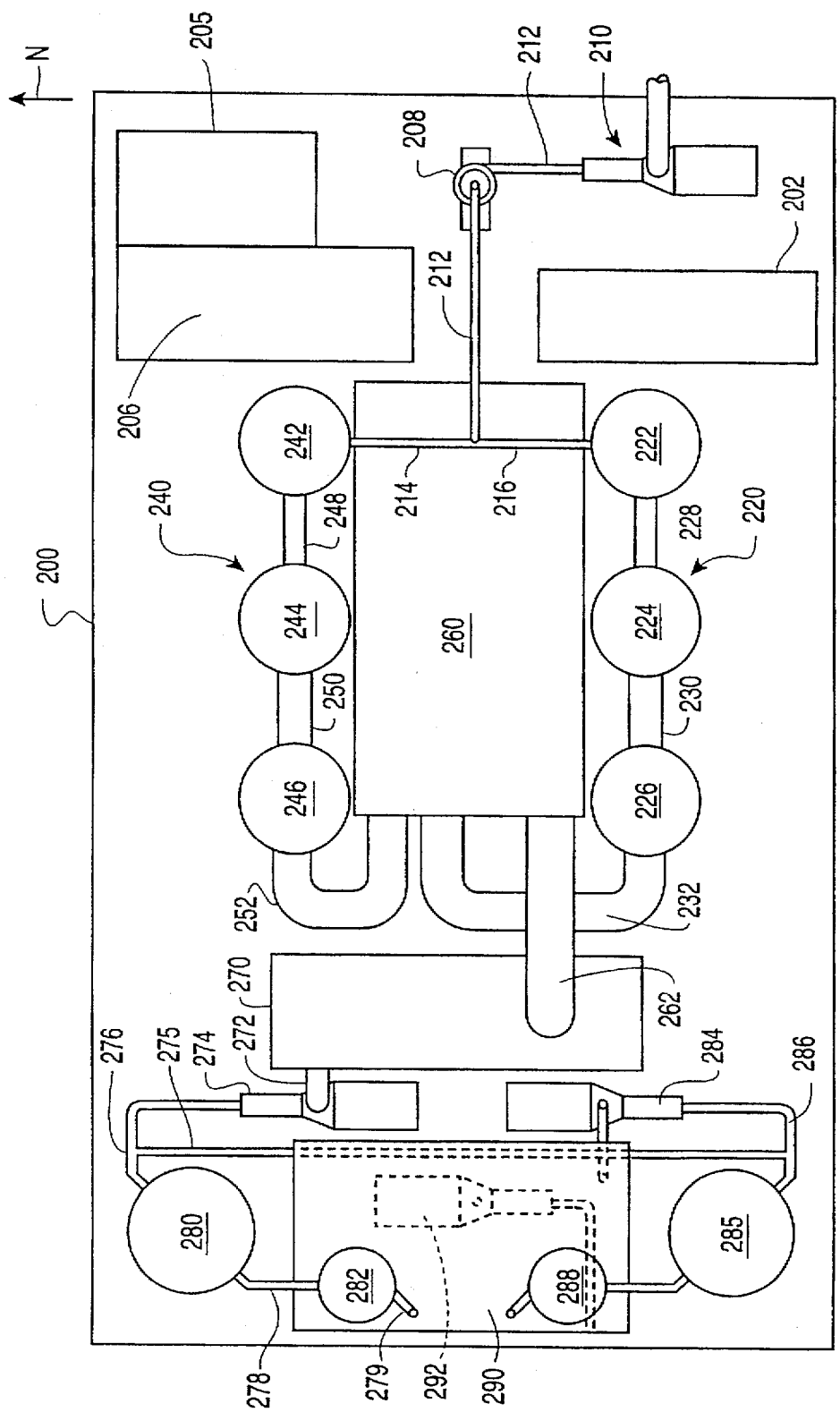
FIG. 2 is a schematic plan view of an embodiment of an apparatus according to the invention.
Figure 8A:
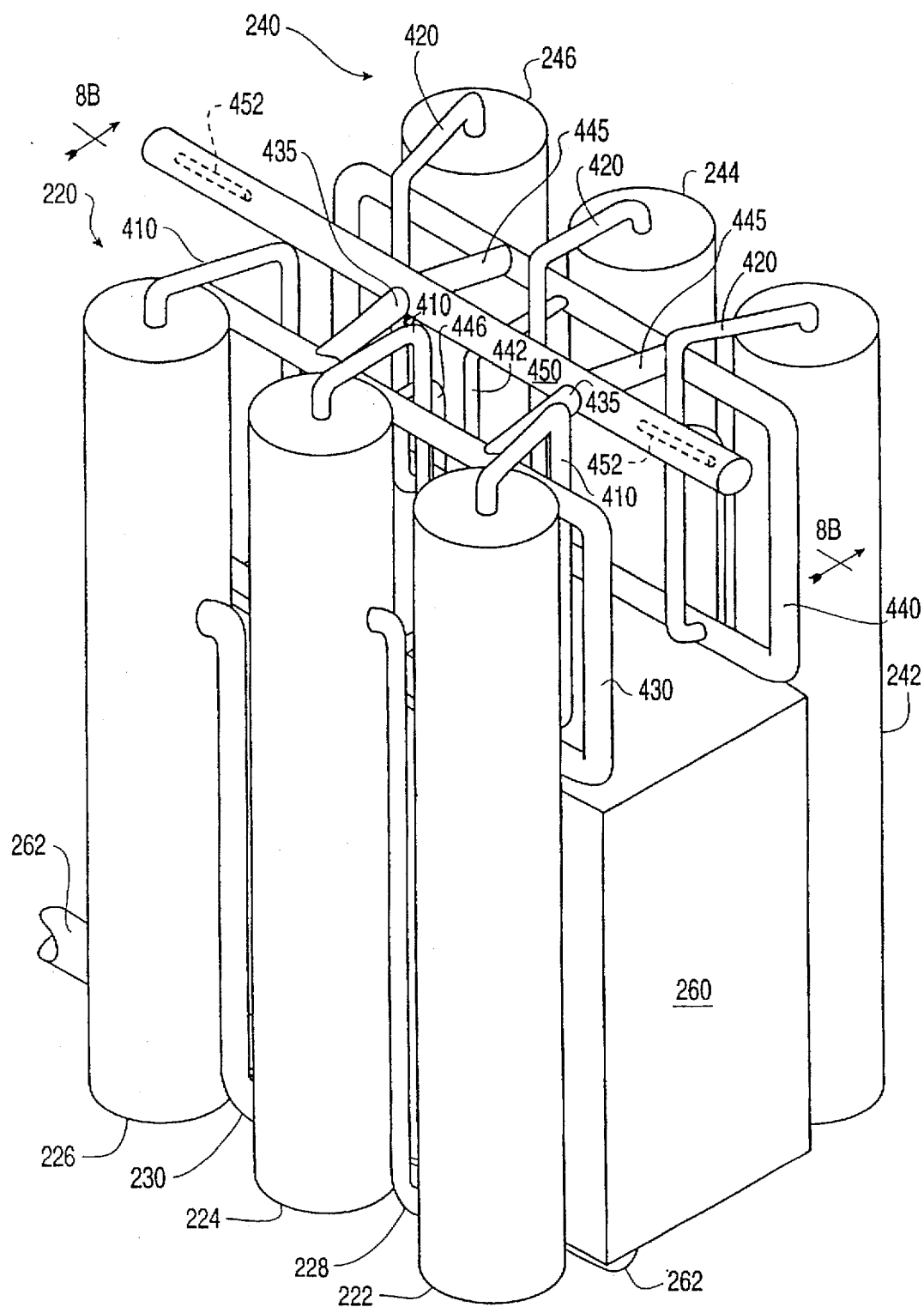
FIG. 8A is a schematic isometric view of an embodiment of ozonating vessels showing overhead ducting for collecting ozone off gas and neutralizing the gas before release into the atmosphere, according to the invention.
Figure 8B:
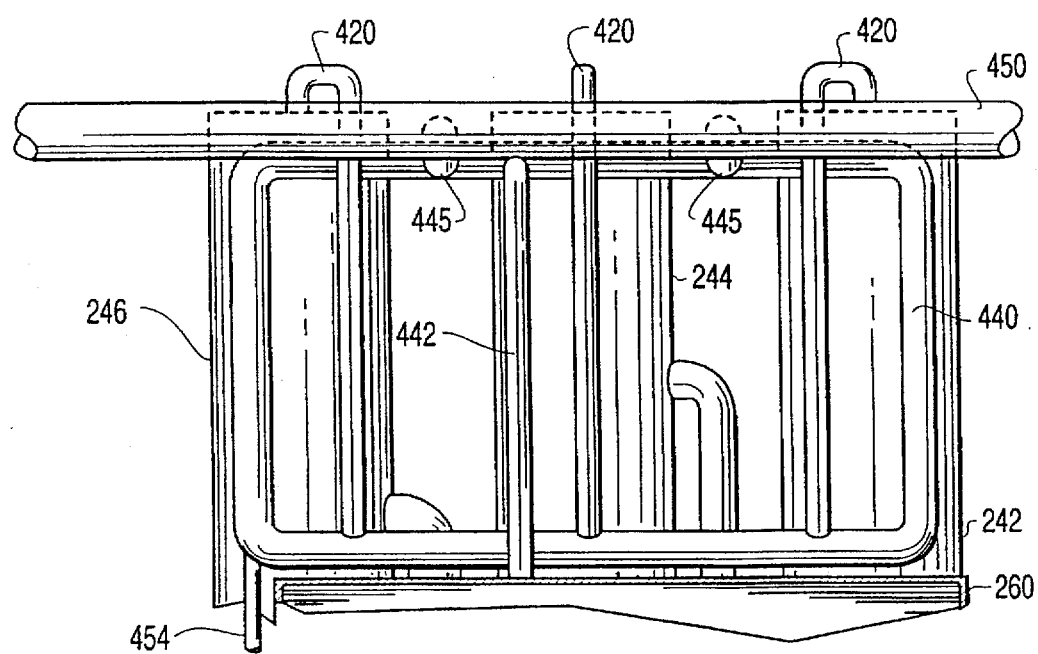
FIG. 8B is a view taken along 8B—8B of FIG. 8A.

FIG. 2 is a schematic plan view of the major equipment of the apparatus of a preferred embodiment of the invention mounted on a mobile platform, not showing the ozone off gas collectino and neutralization system, which is discussed below with reference to FIGS. 8A and 8B. When arranged as in FIG. 2, a system capable of processing 10 gallons per minute of contaminated water may be sized to fit on a 6 foot 6 inch by 11 foot platform, and a 50-gallon per minute system may be mounted on a 6 foot 6 inch by 20 foot platform. The platform may be mounted on a mobile trailer to facilitate transportion of the apparatus to a remote location. As shown, the entire apparatus is mounted on a platform 200. For ease of explanation, compass directions (north, south, east, and west) will be used to describe the location of equipment on the platform. North is indicated by an arrow N on FIG. 2. An optional contaminated water supply pump 210 is located in the southeast corner of the platform. Under certain conditions it may be preferable to place a pump, such as a submersible pump, near or in the water supply rather than on the platform. This pump supplies contaminated water through a discharge conduit 212 extending northward from the pump to an organic whirlpool separator 208, located on an eastern edge of the platform, for removal of particles greater than about 70–75 microns in size. Thereafter, conduit 212 extends from the exit of the separator westward to each of two parallel east-to-west extending trains 220 and 240 of columnar ozonating vessels in a series. The single conduit 212 enters into a T-bend having a south-directed leg 216 for supplying contaminated water to the first (most eastern) columnar vessel 222 of south train 220, and a north-directed leg 214 for supplying contaminated water to the first (most eastern) columnar vessel 242 of the north train 240. Each of the north and south legs 214 and 216 is fitted with a flow restrictor to restrict flow to equal volume rates in each of the legs. The flow restrictor may be in the form of an orifice plate of predetermined orifice size to control the flow rate.

Each of the north and south trains includes three vessels in series located in line in an east-to-west direction. The vessels of each train are interconnected in series with conduits of successively larger diameter so that their interior volumes are in fluid communication. A rectangular, box-shaped partitioned holding tank 260 is located between the north and south trains of columnar vessels. A U-shaped conduit 252 extends from an exit port of the last (westmost) columnar vessel 246 of the north train to an inlet on the west side of the partitioned tank 260. Likewise, a U-shaped conduit 232 extends from an outlet port of the last (westmost) vessel 226 of the south train 220 to an inlet port on the west side of the partitioned tank 260. Thus, both the north and south trains are in fluid communication with the partitioned tank. The function of the partitioned tank is discussed in more detail below. However, a final tank compartment, extending from the eastmost end of the partitioned tank 260 back to the west side of the tank 260, is in fluid communication with an ultraviolet irradiation chamber located to the west of the partitioned tank and the north and south trains by means of a conduit 262. The irradiation chamber is of substantially cylindrical shape with its longitudinal axis oriented in a north-south direction. Conduit 262 extends in an east-west direction from an outlet in the west side of the final tank compartment of the partitioned tank 260 to an inlet in the top of the irradiation chamber 270. Water flows continuously under gravity, assisted by suction of a pump 274, from the retention tank to the irradiation chamber for ozone neutralization. Purified water withdrawal pump 274 is located west of the irradiation chamber 270 for withdrawing water from the chamber. Suction created by this water withdrawal pump assists in flowing liquid from the partitioned tank 260 into the chamber 270. The pump is interconnected with discharge conduits to allow pumping of water to either of two sets of filters when one set is out of service, as will be explained below. The discharge conduit 276 of this pump 274 extends to a filter 280 located in the northwest corner of the platform 200. A conduit 278 extends from the exit of filter 280 to the inlet of activated carbon filter 282, located southwest of filter 280. Conduit 279 extends from the outlet of activated carbon filter 282 to product storage tank 290, mounted on the west end of the platform beneath the activated carbon filter. A product pump 292 is located below the tank 290 for discharging purified water under pressure.

Filter backwash pump 284, located directly south of purified water withdrawal pump 274, pumps water from the product storage tank 290 through an arrangement of conduits to backwash any of the four filters illustrated, in accordance with a control system, explained in more detail below. Briefly, when the pressure drop across a filter, as measured by a differential pressure cell, for example, exceeds a predetermined critical value, the discharge from pump 274 is diverted to the other set of filters. Then, backwash pump 284 is activated and backwashes the filter or filters exhibiting high pressure drop. Under these conditions, the system according to the invention is able to operate continuously, switching from one set of filters to the other while backwashing the set of filters that are not in use. In certain instances, it may be preferred to select an activated carbon filter that does not require backwashing, but that includes a cartridge or other unit type of filter medium container that can be removed and replaced.

Ozone is supplied by an on-site ozone generator 206 located in the northeast corner of the platform 200, just east of the north train 240. A compressor 205, to supply compressed ozone to the diffusers in the various vessels discussed above, is located near and to the east of the generator. A control panel is preferably located west of the water supply pump 210, and east of the south train 220.

FIGS. 3A and 3B show a schematic south side view and a west end view, respectively, of a preferred embodiment of trains of columnar vessels and an interposed partitioned tank. The FIGURES also illustrate the gravity flow of water from column to column, and from the last columns of each train to the partitioned tank by showing water levels in the tanks. Referring to the south train shown in FIG. 3A, water entering first columnar vessel 222 via conduit 216, as explained above, rises to a level H in the vessel. This level is dictated by the pressure drops imposed on the flowing water exiting from the vessel. Thus, the level H is dependent upon the resistance to flow of liquid out of the vessel 222 imposed by vertical upward extending exit conduit 228, and pressure drops encountered at the exit of vessel 222 and the inlet of second vessel 224. By suitably selecting these parameters, static pressure heads h are established by the height of water in one vessel above the height of water in a next vessel, which cause water to flow under gravity through a conduit. Thus, static head $h_1$ provides the motive force for continuously flowing liquid from vessel 222 into the second vessel 224. Likewise, the static head $h_2$, representing the difference in liquid level heights between the second vessel 224 and the third vessel 226, dictates the rate of flow of water from the second vessel 224 to the third vessel 226. In a typical 10 gallon per minute unit, these heights are about 10 inches, and conduits 228, 230, and 232 are respectively 2.5, 3.5, and 4.5 inches in diameter, while columnar vessels 222, 224, and 226 are each about 12 inches in diameter and about 6 foot 8 inches tall. The level H is about 6 feet.

Each of the columnar vessels includes an ozone diffuser device 307 for supplying ozone to the water in the vessel. Typically, the diffuser includes an elongate conduit 305 extending from an ozone source (not shown) through the roof of the vessel and down to the vicinity of the base of the vessel. At the base of the vessel, the conduit is connected to a porous or perforated diffuser 307 that may be ring shaped, so that ozone carried under pressure in the conduit bubbles from the diffuser and rises up through the liquid phase in the chamber. While rising through the water, ozone diffuses, by mass transfer phenomena, from the bubble into the water where it is available for oxidizing pathogens and other oxidizable matter in the water. Most preferably, to maximize mass transfer of ozone to water, the bubbles should be small to provide a high surface to volume ratio. Thus, it is preferred to use a porous ceramic diffuser, coated with a membrane having pores of such size as to produce ozone bubbles in the 5–7 micron size range, such as that supplied by Refractron Technologies Corp. of Newark, N.Y., in particular their seven-inch dome diffuser No. MAF-3. Of course, other diffusers and larger or smaller bubbles are also effective, but, as explained above, small bubbles are favored as more effective.

As can be seen more clearly in FIG. 3B, water exits from outlet 227, near the base of third columnar vessel 226 of the south train 220 and enters into the U-shaped conduit 232 extending to an inlet of partitioned tank 260. Moreover, the U-shaped conduit 252 extends from an outlet 247 near the base of the third columnar vessel 246 of north train 240, that is equipped and operates identically to south train 220 as described above, to an inlet of a first tank of partitioned retention tank 260. For a 10 gallon per minute system, the tank 260 may be about 4 feet high, 2 feet wide, and 4 feet long.

Figure 4A:
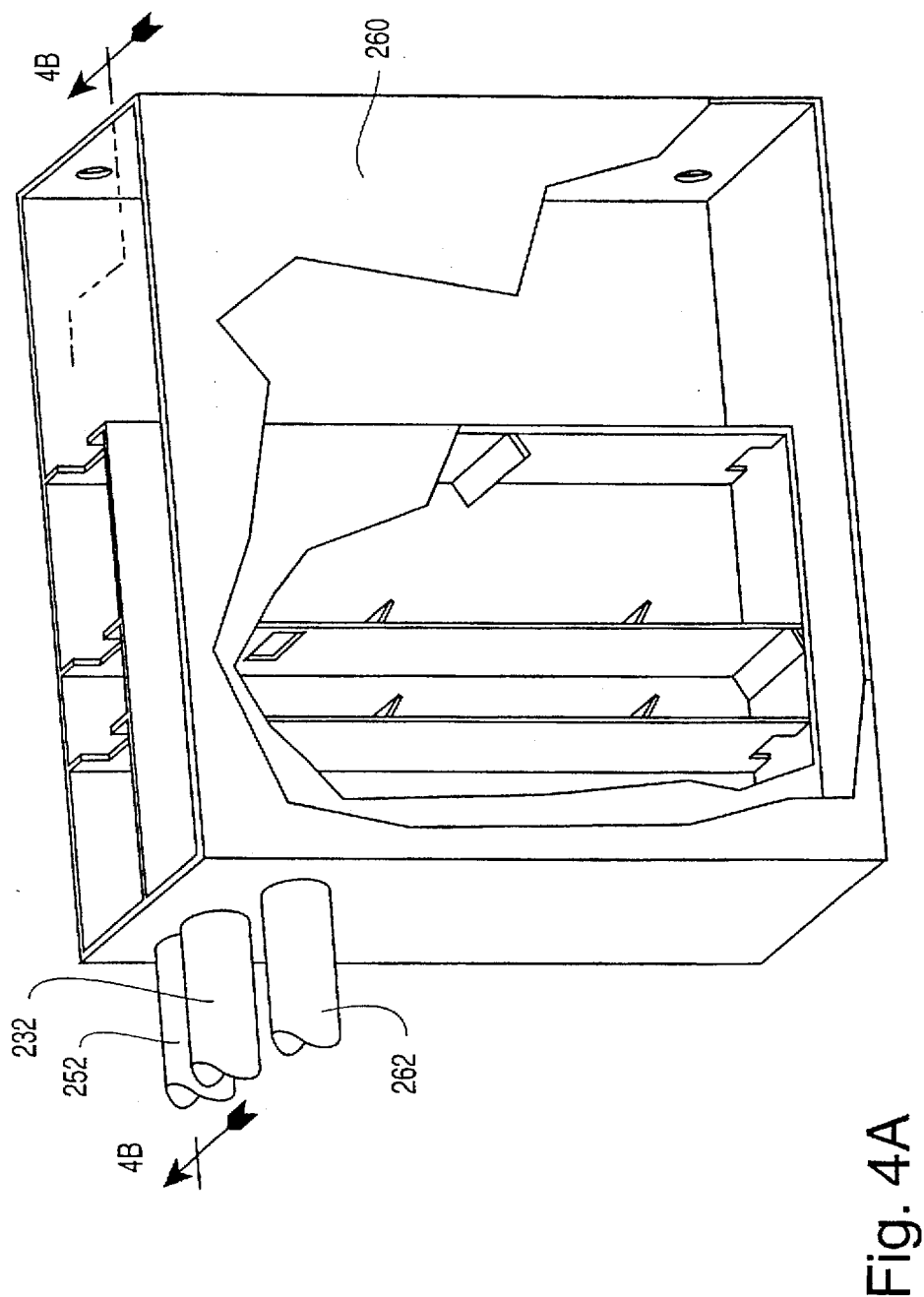
FIG. 4A is a schematic view of an embodiment of an ozonated water retention tank, in partial cross section, to show internal details.
Figure 4B:
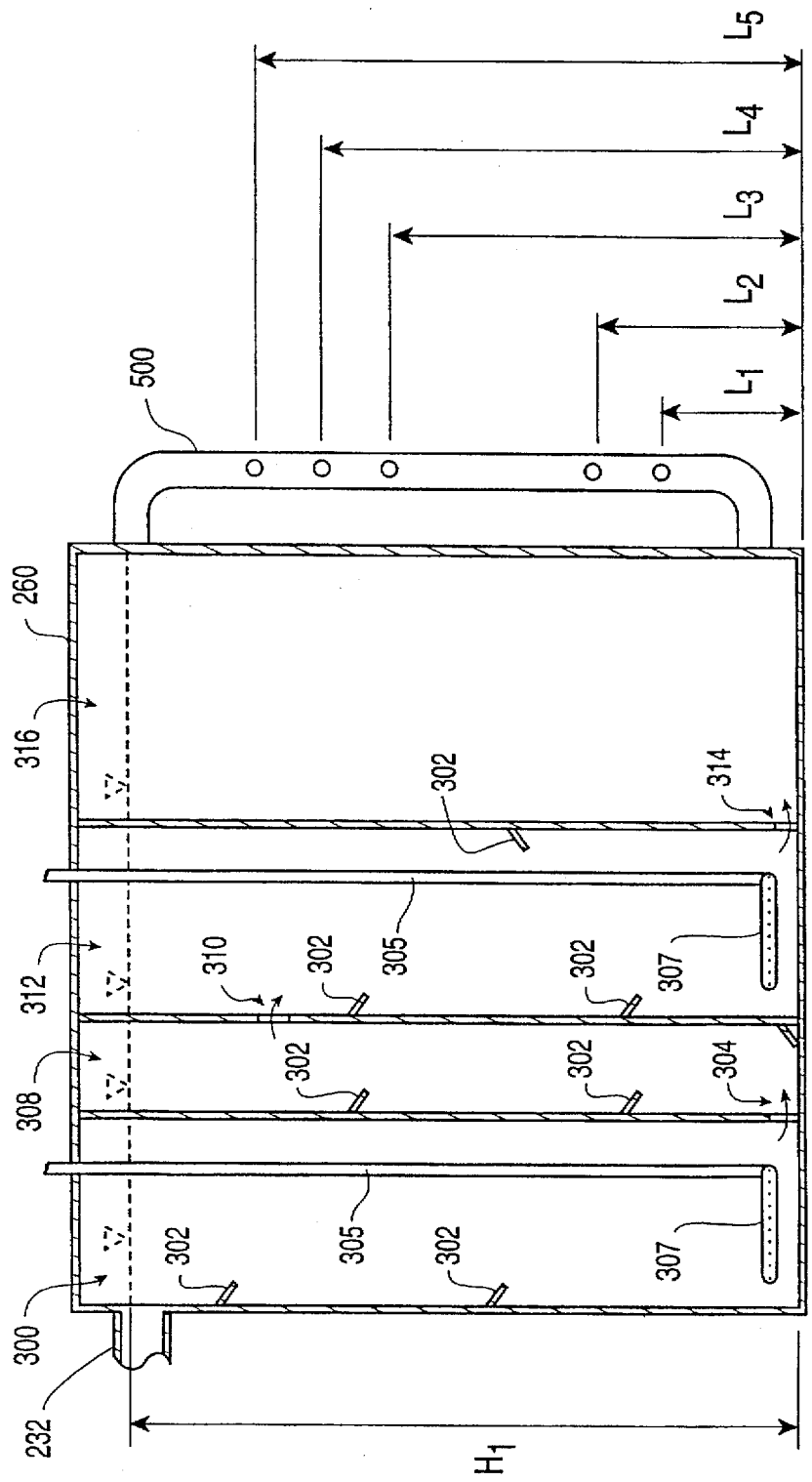
FIG. 4B is a cross section along 4B—4B of FIG. 4A.

An embodiment of the partitioned retention tank is shown in FIGS. 4A and 4B. Influent ozonated water in columnar vessel exit conduits 252 and 232 enters into a first tank compartment 300 supplied with baffles 302 extending outward from sides of the tank compartment. These baffles control water flow currents in the compartments allowing better gas-liquid contact and are preferably mounted to the walls of each compartment. The water rises to a level $H_1$ (about 3 feet 6 inches for a 10 gpm system) in the tank compartment. $H_1$ is less than $(H-h_1-h_2)$ by $h_3$, where $h_3$ is the static head that allows gravity flow into the compartment. The tank compartment is supplied with a diffuser 307 for supplying ozone to water in the tank, as in the case of the columnar vessels. Ozonated water continuously exits from an exit port 304 at the base of a wall of compartment 300 that is common with second tank compartment 308 and enters into the second compartment. As illustrated, compartment 308 is a "residence compartment", in the sense that ozone is not added in this compartment. Rather, the water is held for a period of time to allow ozone to react with oxidizable material in the water. The water in this second tank compartment is able to rise to a level $H_1-h_4$, where $h_4$ (a small height due to low pressure drop) is the liquid static head that causes water to flow continuously from first tank compartment 300 to second tank compartment 308. Water exits continuously from second tank compartment 308 through a slot-like rectangular opening 310 located in a side of tank compartment 308 that is common with third tank compartment 312 and flows into the third tank compartment. Third tank compartment 312, like first tank compartment 300, is supplied with a diffuser 307. Ozonated water from this compartment exits through an outlet 314 near the base of one sidewall of the compartment that is common with the adjoining fourth tank compartment 316. Thus, the exiting ozonated water flows into the fourth, and final, compartment of the partitioned tank 260. This compartment provides a further residence time for the ozonated water, preferably about 9 to about 40 minutes, and the water is then withdrawn through an outlet 318 in the west side of the compartment to flow through outlet conduit 262 to the inlet of the ultraviolet irradiation chamber 270.

Figure 5:
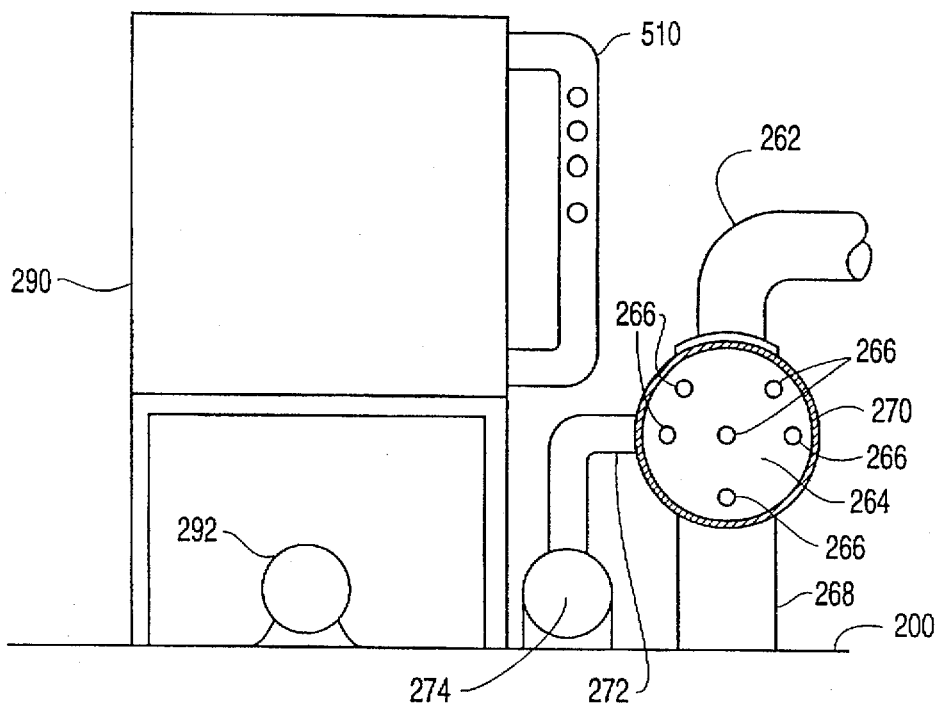
FIG. 5 is a schematic side view, in partial cross section, showing an embodiment of an ultraviolet irradiation chamber and water storage tank mounted on a platform, according to the invention.

FIG. 5 is a side view, in partial cross section, showing the ultraviolet radiation chamber and product storage tank as seen from the south side of the platform. Details, such as discharge piping from pumps and filters, are not shown, for ease of explanation. Water withdrawn through outlet 318 (shown in FIG. 4B) flows into conduit 262 and thence into ultraviolet irradiation chamber 270, as shown in FIG. 5. The ultraviolet irradiation chamber 270 is mounted on a pedestal 268 that is fixedly attached to the platform 200. The cross-sectional view of the ultraviolet irradiation chamber shows the north end-plate 264 of the chamber to which is mounted a plurality of ultraviolet sources, such as ultraviolet lamps, 266. As explained above, these radiation sources provide sufficient ultraviolet light to completely irradiate the contents of the chamber 270. Moreover, the radiation supplied is in two wavelengths: a first wavelength to catalyze the breakdown of ozone into free radicals to thereby accelerate oxidation reactions to remove pathogens and other oxidizable material; and a second wavelength that encourages the breakdown of ozone into oxygen. Preferably, the ultraviolet radiation is supplied in the wavelengths 254 nanometers and 187.5 nanometers. More preferably, the radiation is supplied such that the ratio of 254 nanometers to 187.5 nanometers radiation is in the ratio 5:1. Thus, the ultraviolet chamber 270 is sized to irradiate water with at least about 4.0 watts of 254 nm ultraviolet radiation per gallon per minute, and at least about 0.8 watt of 187.5 nm radiation per gallon per minute before the water passes from the chamber to subsequent stages in the purification process.

Water exiting from the irradiation chamber 270 in conduit 272 is preferably free of residual ozone. The exiting water is pathogen free and free of any matter having a biological oxygen demand. This water is pumped, via water withdrawal pump 274, through a series of filters, to a product storage tank 290.

Figure 6:
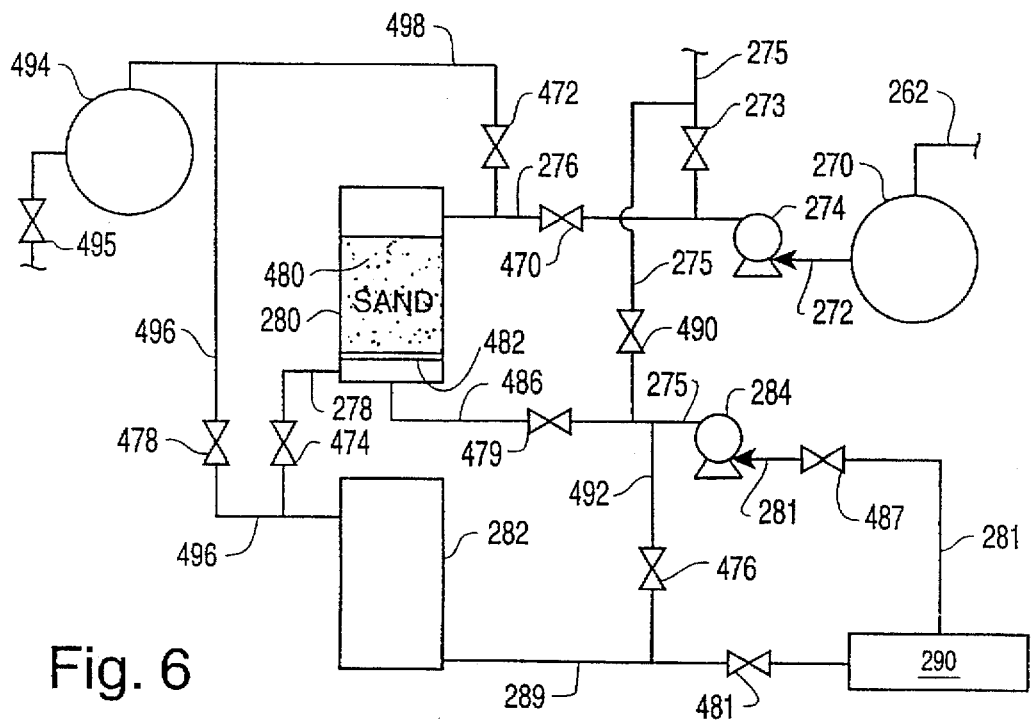
FIG. 6 is a process flow diagram of an embodiment of a filtration and filter backwash system according to the invention.

The filtration system according to the invention may be better understood with reference to FIG. 6, illustrating schematically a preferred embodiment of the filtration and backwash system controlled by a filter cycle controller (not shown) that sends electrical or pneumatic signals to the control valves shown. Initially, when the system is operating under normal continuous operation, with water is being filtered through filters 280 and 282, the controller maintains the following valves closed: valve 273, valve 472, valve 478, valve 479, valve 476, and valve 487. Thus, water withdrawal pump 274 removes water continuously from irradiation chamber 270 and charges the water under pressure through conduit 276 and open valve 470 into the filter 280. Conduit 276 is fitted with a flow restrictor to limit flow to the combined volume flow rates through trains 220 and 240, which are in turn controlled by flow restrictors in conduits 216 and 214. Filter 280, shown in schematic cross section, contains a filter medium 480, preferably substantially uniform particles of silica sand of about 1 millimeter in size. This provides a bed of substantially uniform porosity and size to remove any particulates greater than about 10 microns in size from the water. The sand medium 480 is supported on a porous filter support 482, as shown. Water leaving the filter in conduit 278 is charged through valve 474 into activated carbon filter 282. In this filter the water is further polished to remove particulates, color, odor, and taste. Potable water flows from the activated carbon filter through conduit 289 and open valve 481 into product storage tank 290.

After continuous use for a period of time, particulates that collect in the filter medium 480 of filter 280 cause pressure drop across the filter to increase. This is sensed by a differential pressure cell mounted to detect pressures at the filter inlet and outlet. When the pressure drop increases above a predetermined level, preferably 10 psi, the differential pressure cell communicates the level to the controller, which then reconfigures the automatic valves to backwash the filter to remove particulates. While the activated carbon filter 282 may also be backwashed, it is preferred to use activated carbon filters with self-contained cartridges containing the medium. Such cartridges may be readily removed and replaced during the backwash cycle.

When the backwash cycle for filter 280 is triggered, valve 273 opens, and valves 470 and 490 close, thereby diverting pumped water from conduit 276 into conduit 275 and thence to alternate filters 285 and 288, shown in FIG. 2. Referring to FIG. 6, during backwash of filter 280, the following valves reconfigure automatically under command of the filtration cycle controller: 470, 490, 474, 476, and 481 close; and valves 487, 479, and 472 open. Water then flows from product storage tank 290 through conduit 281 and open valve 487 into the suction of backwash pump 284, located beneath tank 290. Pump 284 discharges this water through conduit 275 and valve 479 into conduit 486 and thence into the space below the filter medium support 482 in filter 280. The flow of water through the porous filter medium 480 fluidizes the medium and dislodges particulates, carrying them with the water stream from the filter 280 into conduit 498, through open valve 472. From conduit 498, the backwash water flows into an optional small irradiation chamber 494 or is discharged back to the source of the water. Here the water is subjected to ultraviolet radiation to neutralize ozone before being discharged through valve 495, for disposal. Typically, when using the preferred filter medium, the backwash cycle uses only about 15 to 20 gallons of water for a 14-inch diameter filter filled with a 32-inch height of one-micron sand that is sized for a 10 gpm system.

If the activated carbon filter is of a type that must be backwashed, then backwash water is diverted from conduit 275 by closing valve 479 and opening valve 476 into conduit 492 and thence into conduit 289, the outlet of the activated carbon filter 282. The backwash water removes particulates from the activated carbon filter medium and carries these particulates out of the filter in conduit 496, through now opened valve 478, and thence to the optional small irradiation chamber 494 (valve 472 is closed), for neutralization of ozone or disposal to the water source.

While the above explanation relates to the backwashing of filters 280 and 282, a person of ordinary skill in the art will readily appreciate that an identical or similar system is also useful for the backwashing of the other set of filters 285 and 288. Under these circumstances, the backwash pump 284 discharges water via conduit 275 through open valves 490, around closed valve 273, to the other set of filters.

Figure 7:
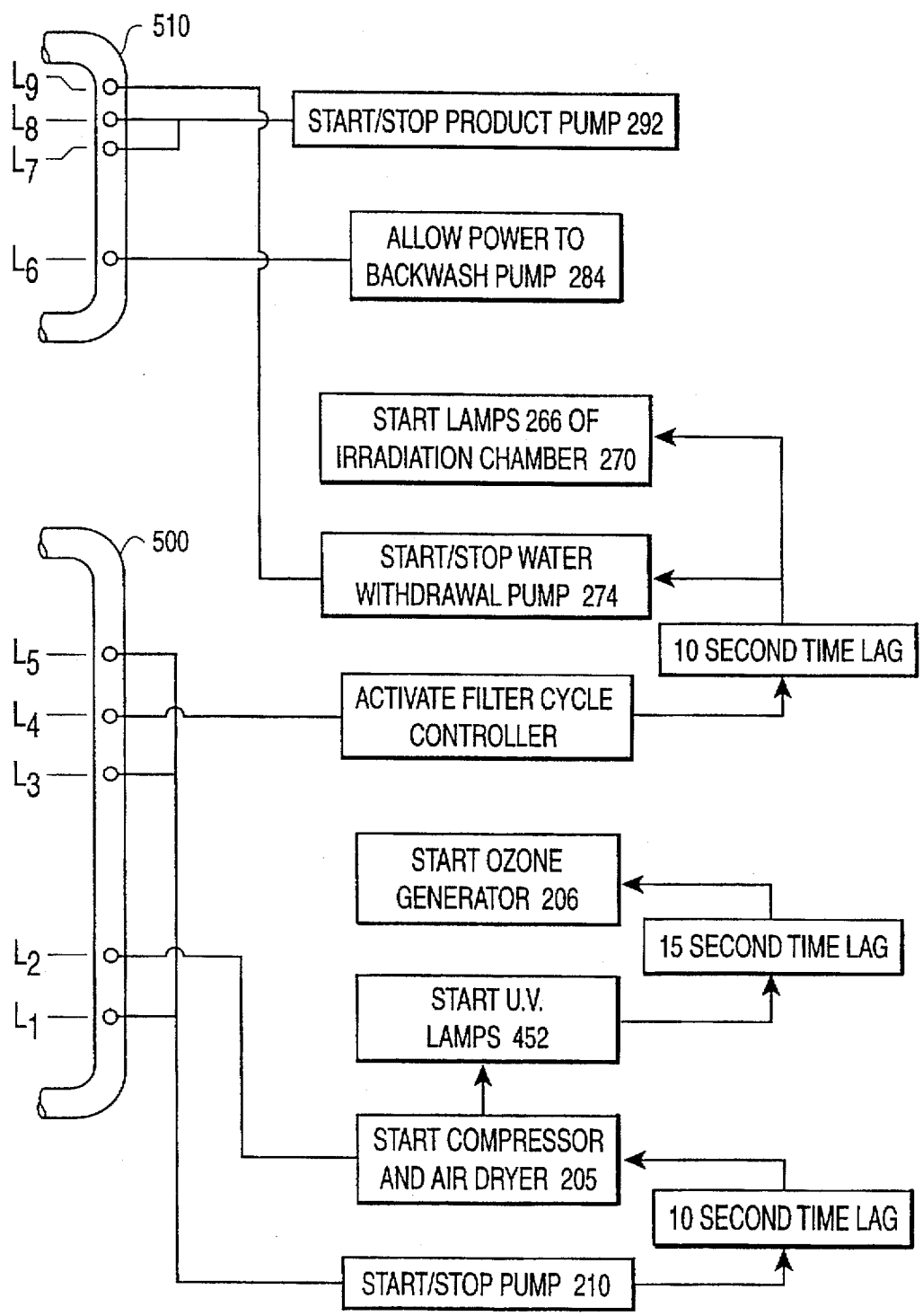
FIG. 7 is a simplified diagrammatic representation of an embodiment of a control system in accordance with the invention.

As briefly discussed above, the system of the invention includes a robust and simple control system, an embodiment of which is illustrated in FIG. 7. The schematic of the preferred embodiment of FIG. 7 illustrates the control legs 510 of product tank 290, and of 500 of partitioned retention tank 260, respectively. Each of the legs is supplied with sight-glasses in the vicinity of float switches labeled $L_1$–$L_9$, as shown. These float switches are of the type that will float in water thereby closing an electrical circuit. When the water recedes, the float switch, no longer able to float horizontally, bends downward under gravity opening the control circuit.

Upon initiating the system, switch $L_1$ is in the closed position so that it allows the contaminated water feed pump 210 (or a submersible pump, as discussed above) to start up. After a ten-second delay, the compressor and air dryer 205 are started. However, if the level in the control leg 500 should reach $L_2$ in less than ten seconds, then the closing of switch $L_2$ will initiate the compressor and air dryer. While water is being pumped into the system, the level in tank 260 will rise until the water level reaches switch $L_3$. When the liquid level passes through $L_3$, moving upward, the $L_3$ circuit is not initiated. Rather, the liquid level continues to rise until it reaches switch $L_4$, which then closes and thereby activates the filter cycle controller. This filter cycle controller (not shown) controls the filter cycle, as explained above and illustrated in FIG. 6. After a ten-second delay, the water withdrawal pump 274 is started up. At this point, the valves of the filtration and backwash cycle have been properly aligned by the filter cycle controller. When a measured differential pressure, as measured by a differential pressure cell, across the filters 280 or 285 (depending on which is in operation) exceeds a predetermined level, the filter cycle controller instructs the above-described change in valve position to initiate backwashing and transfer filtration to the alternate set of filters.

The system is controlled to protect from an excessively high level of water in partitioned tank 260. Thus, when the water level reaches switch $L_5$, a signal is directed to the contaminated water feed pump 210, to turn off the pump. The water level in tank 260 will then drop, since water is being removed by pump 274, until it reaches switch $L_3$. At that point, switch $L_3$ will close a circuit to direct the start-up of pump 210. Thus, the water level in tank 260 is controlled between the heights of switches $L_3$ and $L_5$, respectively, representing the high and low levels of water in the tank during continuous operation.

At the same time, water has also flowed through the system into the product tank 290. When the water reaches a first switch $L_6$ in a control leg 510 of this tank, a circuit closes to allow power to the backwash pump 274. Thus, until a level as high as switch $L_6$ has been attained in the product tank 290, the filter cycle controller cannot initiate a backwash cycle. This is a precautionary measure to ensure that there is sufficient water in the product tank 290 to allow a complete backwash cycle. As water in the tank continues to rise, while the system produces purified water, the water level will pass switch $L_7$ (without effect) and encounter floater switch $L_8$. At this point, switch $L_8$ closes, thereby starting up product pump 292. Thus, water is then withdrawn from the product tank. The discharge conduit of product pump 292 is fitted with a flow restrictor set to the same volume rate as contaminated water charge pump 210. If the level in the product tank should drop to below switch $L_7$, then switch $L_7$ will close, thereby shutting down product pump 292. This will allow the level in tank 290 to once again rise as purified water continuously flows into the tank. To protect against overflow, when the tank level reaches switch $L_9$, the switch closes and directs the water withdrawal pump 274 to shut down, thereby discontinuing the flow of purified water into tank 290. In order to avoid shutting down the entire process, due to backing up of water in tank 260 because of the shutdown of withdrawal pump 274, the circuit of switch $L_4$, at ten-second intervals, attempts a startup of pump 274. Once the level in tank 290 has dropped below the level of switch $L_9$, the withdrawal pump 274 is started under an instruction from the circuit of switch $L_4$. Thus, under continuous operation, the system of the invention maintains a water level in tank 290 between limiter switches $L_7$ and $L_9$.

As explained above, with reference to FIG. 2, the apparatus of the invention includes an ozone generator. The ozone generator operates under pressure supplied by a compressor 205. The compressor inducts air from the atmosphere, and passes the air through a filter to remove any particulates and oils. Importantly, the compressor is also fitted with an air dryer that removes any moisture in the air to produce a substantially bone-dry air supply for charging to the ozone generator. Preferably, a compressor capable of operating at pressures up to 200 psig is utilized. The capacity of the air compressor will depend upon the amount of ozone required, which in turn depends upon the degree of contamination of the water. However, for a system capable of treating 10 gallons per minute of contaminated water, a 3 horsepower motor compressor capable of a discharge pressure of 200 psig, is preferred. An example of a useful compressor is the Kaeser Sigma 3X or 4X screw compressor that is available from Kaeser Compressors, of West Germany. The selection of the compressor must be matched to the requirements of the type of ozone diffuser used. When a porous ceramic diffuser, indicated as preferred, is used, then a relatively high discharge pressure is necessary to force ozone through pores of the diffuser to produce bubbles in the 5–7 micron size range. If, however, larger sized bubbles are used, then the compressor may not necessarily require a high discharge pressure.

The ozone generator, selected to be compatible with the discharge pressure of the compressor, operates by generating an electrical arc through the compressed air stream. This electrical arcing process generates ozone from oxygen atoms in the air. The mixture of residual air gas components and ozone then flows under pressure from the ozone generator into a header from which it is distributed controlledly to each of the diffusers 307 located in vessels, as discussed above. For a 10-gallon per minute system, a generator able to produce about 2.5 pounds of ozone per day is preferred. Such a generator is available from Ozone Purification Technologies, Inc. of Tucson, Ariz., as model No. WPM-40AT, for example.

As discussed above, the system of the invention does not release ozone off gas into the atmosphere. Instead, all ozone off gas is collected in a common header where it is subjected to ultraviolet radiation for conversion to oxygen so that only oxygen is released into the atmosphere. FIGS. 8A and 8B are schematic illustrations of a preferred ducting arrangement for collecting ozone off gas from each of the columnar ozonating vessels of both the north and the south train, as well as from the partitioned retention tank. Superfluous details are not shown for ease of explanation. Each of the south columnar vessels, 222, 224, and 226, is supplied with an off gas duct 410 in its roof. Likewise, the vessels of the north train are each supplied with an off gas duct 420. These off gas ducts extend vertically downward in the space immediately above retention tank 260. North and south vessel ducts are, respectively, connected to a lower horizontal limb of a north header 440 and a south header 430. The headers are each ducts having four limbs formed into a rectangular ring shape. Each of the north header 440 and the south header 430 is supplied with a drainpipe, (not shown) at a lowest point of the lowest limb of the header to drain any liquid carried over into the header. Ozone off gas collects in the upper horizontal limbs of the headers 440 and 430 and flows through connecting ducts 445 and 435, respectively, into a common duct header 450. Duct 450 is open at its two ends and is supplied with sources of ultraviolet radiation 452 aligned to irradiate its contents. Thus, ozone carried in duct 450 is reduced by ultraviolet radiation to harmless oxygen before exiting from ends of duct 450 into the atmosphere.

Ozone is known to be a highly oxidative composition that will react with many materials of construction to cause oxidation, corrosion, and ultimate failure of the structure. Therefore, care should be exercised in selecting materials of construction that come into contact with ozone or highly ozonated water. Preferably, vessels and conduits that come into contact with ozonated water should be made of at least 304L stainless steel, or materials of equivalent resistance to ozone oxidation. Alternatively, to reduce the weight of the equipment, certain components of the apparatus not subject to high pressure may be fabricated from structural engineering plastics that are resistant to ozone oxidation. Such structural engineering plastics include polyvinyl chloride, polypropylene, nylon, acetal, and the like. In those areas of the system where structural materials are also subject to ultraviolet irradiation, ultraviolet radiation-resistant structural plastics may be used. For example, the ultraviolet irradiation chamber may be fabricated from an ultraviolet-resistant polyvinyl chloride, such as CPVC.

While the system of the invention has been illustrated and explained with reference to its preferred embodiments, it should be understood that other embodiments are also useful, depending upon the degree of contamination of the water to be purified. For example, if the water to be purified is not highly contaminated, then, with reference to FIG. 1, it may not be necessary to utilize three columnar vessels in series in a train. Rather, one or two such vessels may suffice. Further, it may not be necessary to utilize a retention tank 40, as shown, if the water exiting from the columnar vessels is already purified, in the sense of being pathogen free and free of oxidizable biological contaminants. Under these circumstances, the water exiting from the columnar vessel(s) would bypass the retention tank 40 and be charged directly to the ultraviolet irradiation chamber 64 for ozone neutralization. Consequently, the system of the invention is extremely flexible and the process of using the system may be tailored for a particular contaminated water. Moreover, the selection of an ozone generator could also play a significant role in the selection of which apparatus to use, and which to bypass. Thus, if an ozone generator that is able to provide a high level of conversion of oxygen to ozone is selected, and this ozone is charged to ozonating vessels through a diffuser, as described above, then a sufficiently high level of ozone concentration may be achieved in, for instance, columnar ozonating vessels 22 and 28, with reference to FIG. 1, that further ozonation and treatment is not necessary. Again, under these circumstances, any additional columnar vessels, such as vessel 34, and the retention tank 40 may be bypassed. The ozonated water would then flow directly to the ultraviolet chamber for neutralization of substantially all the residual ozone. Of course, the system still requires a sufficient residence time to enable the high concentration of ozone achieved to oxidize pathogens, microorganisms, and any other oxidizable organic matter in the water.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A continuous process for purification of contaminated water to produce potable water for human consumption, the process comprising:
    (a) continuously flowing the contaminated water into a first vessel, of a series of sequential vessels, to a predetermined first liquid height in the first vessel;
    (b) supplying ozone gas to the water in the first vessel, the water flowing under laminar flow conditions;
    (c) continuously overflowing ozonated water, under gravitational motive force, into a last of the series of vessels, to a last predetermined liquid height, the last liquid height less than the first liquid height, the water flowing under laminar flow conditions in the last vessel;

(d) supplying additional ozone to the water in the last vessel;

(e) continuously removing water containing ozone from the last vessel;

(f) treating the removed water containing ozone to neutralize substantially all the ozone; and (g) producing substantially pathogen-free potable water.

2. The process of claim 1, wherein the treating of removed water comprises subjecting the water containing ozone to ultraviolet light of a wavelength that catalyzes the reduction of ozone to oxygen.

3. The process of claim 2, wherein the ultraviolet light includes light in the wavelengths 254 nanometers and 187.5 nanometers.

4. The process of claim 1, further comprising, after treating the water, filtering the water to remove particulates.

5. The process of claim 4, further comprising, after filtering to remove particulates, filtering through an activated carbon filter medium.

6. The process of claim 1, further comprising collecting ozone-containing off gas from the series of vessels; and converting ozone in the off gas to oxygen before releasing the off gas to the atmosphere.

7. The process of claim 1, further comprising, after the step of removing water from the last vessel, flowing the water from the last vessel into a tank partitioned into adjacent tanks, the adjacent tanks in fluid communication; and flowing water through the adjacent tanks under laminar flow conditions, before treating the removed water.

8. The process of claim 7, further comprising ozonating water in at least one of the adjacent tanks.

9. The process of claim 1, wherein the step of supplying ozone gas and the step of supplying additional ozone comprise supplying sufficient ozone to cause an ozone concentration of from about 1.0 to about 8.0 mg/l in water in the continuous process.

10. A continuous process for purification of contaminated water to produce potable water for human consumption, the process comprising:

(a) ozonating the contaminated water to a concentration of from about 1.0 to about 8.0 mg/l of ozone, while the water is in laminar flow condition in a continuous liquid phase; wherein the ozonating comprises gravity flowing water through a series of vessels while maintaining substantially laminar flow conditions in the vessels; and supplying ozone to the water in some of the vessels, the vessels sized to provide a sufficient residence time to allow oxidation of substantially all pathogens and oxidizable organic matter in the water to produce potable water;

(b) oxidizing pathogens with ozone in the ozonated water to produce substantially pathogen-free water containing residual ozone; and (c) treating the substantially pathogen-free water containing residual ozone to neutralize substantially all the residual ozone.

11. The process of claim 10, wherein the ozonating includes ozonating the contaminated water to provide an ozone concentration of from about 1.5 to about 4.0 milligrams per liter.

12. The process of claim 10, wherein the ozonating comprises bubbling ozone-containing air into the contaminated water such that the bubbles rise countercurrent to downward flowing water.

13. The process of claim 12, wherein the ozonating comprises producing bubbles by a porous diffuser, and the produced bubbles comprise bubbles in the size range from about 5 to about 7 microns.

14. The process of claim 10, wherein the treating of the water to neutralize residual ozone comprises subjecting the water to ultraviolet radiation in the wavelengths that convert ozone to oxygen.

15. A method for the treatment of an aqueous-based stream, comprising the steps of:

(a) contacting an aqueous-based stream with ozone;

(b) exposing said aqueous-based stream to a first source of ultraviolet radiation having a wavelength of 254 nanometers contemporaneously with said step of contacting; and (c) exposing said aqueous-based stream to a second source of ultraviolet radiation having a wavelength of 187.5 nanometers contemporaneously with said step of contacting.

16. A method, as claimed in claim 15, wherein the ratio of radiation having a wavelength of 254 nanometers to radiation having a wavelength of 187.5 nanometers is 5:1.

17. A method, as claimed in claim 15, wherein said first source of radiation is supplied at 4.0 watts and said second source of radiation is supplied at 0.8 watts.

18. A method, as claimed in claim 15, wherein said aqueous-based stream comprises ozone at a concentration of about 1.0 to about 8.0 mg/l.

* * * * *